Figures 1, 2:
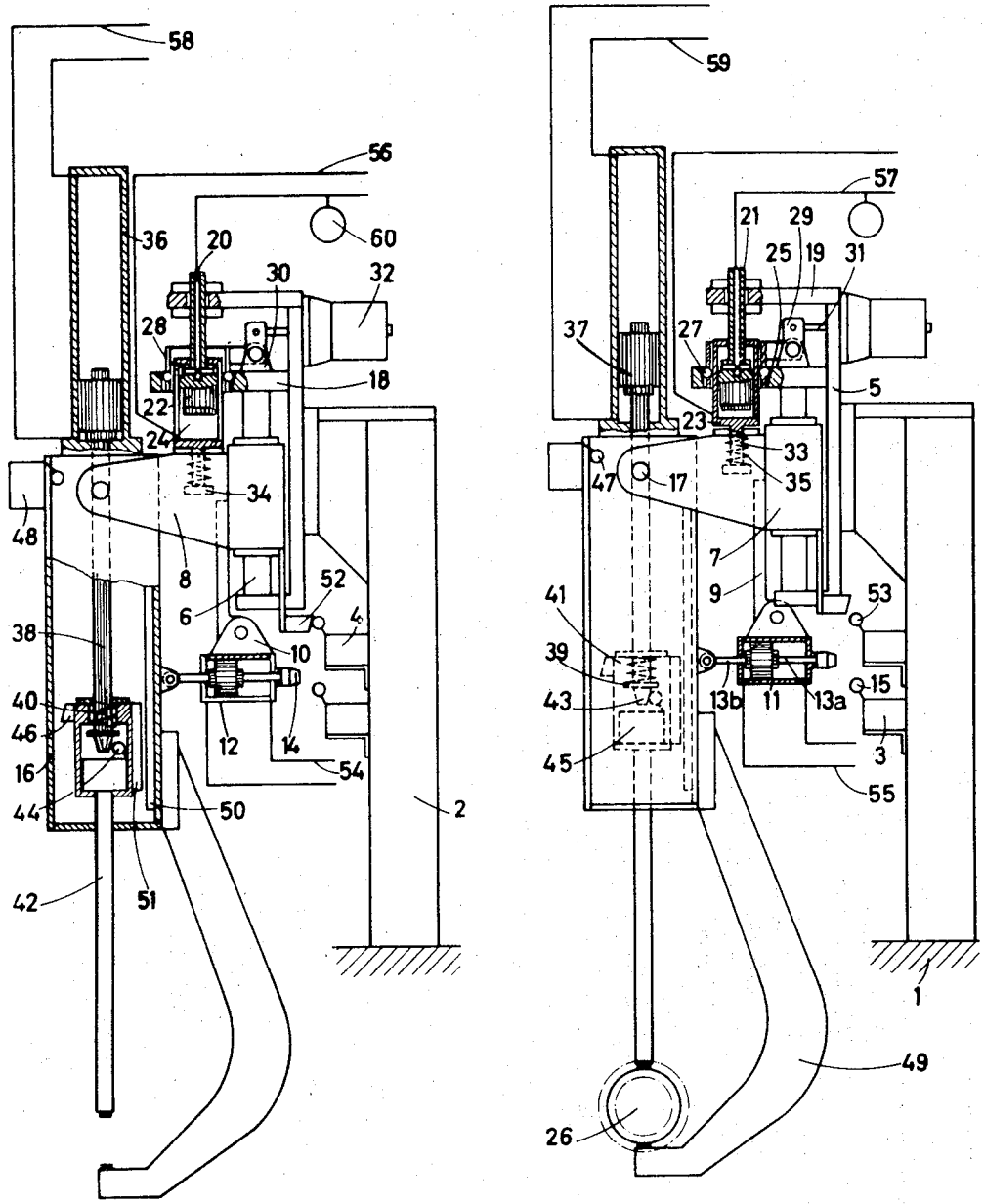

Nov. 28, 1967  W. HELDMAIER  3,354,553
MEASURING APPARATUS FOR MACHINE TOOLS
Filed Aug. 11, 1966

INVENTOR

BY
ATTORNEY 3,354,553
MEASURING APPARATUS FOR MACHINE TOOLS
Wolfgang Heldmaier, Esslingen, Zollberg, Germany, assignor to Fortuna-Werke Spezialmaschinenfabrik, Aktiengesellschaft, Stuttgart-Bad Cannstatt, Germany
Filed Aug. 11, 1966, Ser. No. 571,898
Claims priority, application Germany, Aug. 13, 1965, F 46,884
17 Claims. (Cl. 33—178)

The present invention relates to a measuring apparatus for successively measuring different portions of a workpiece, and more particularly to apparatus for controlling a machine tool by which successive portions of a workpiece are reduced to predetermined selected measurements. For example, a grinding machine is controlled depending on the absolute measurement of the workpiece while grinding different portions of the workpiece having different diameters.

In accordance with the prior art, a measuring apparatus with a pair of feelers set to a predetermined measurement, is provided for each portion of the workpiece which has to be ground or cut. The several measuring devices are individually mounted on the movable table of the machine tool, and move with the same. The provision of a plurality of measuring devices with the associated operating means on the movable table of the machine tool takes up a great deal of space and interferes with the operation of the machine tool. Furthermore, in some machine tools, there is no room left for the mounting of several measuring devices.

It is one object of the invention to provide one measuring apparatus for measuring different portions of a workpiece.

Another object of the invention is to provide one measuring apparatus for controlling the machine tool to machine successive portions of the workpiece to predetermined dimensions presettable on the measuring apparatus.

If for the measuring of workpiece portions of different dimensions, only a single measuring apparatus provided with feelers is to be used, it is not possible to set the apparatus to a fixed measurement, as in the prior art constructions in which a measuring device is provided for each dimension of the workpiece. It would be too difficult and time-consuming to reset the feelers of a measuring device according to the prior art for portions of the workpiece having different diameters, using special gauges. Furthermore, the feelers must be in a retracted position before the apparatus is moved to the measuring position, permitting to place the feelers in the proper position for measuring the largest diameter occurring on the workpiece.

A measuring apparatus according to the invention provides only one pair of feelers and control means connected with the feelers, for example a control part moving with one feeler, and an electric gauge connected with the other feeler so that a machine tool can be controlled by impulses depending on the positions of the feelers.

One embodiment of the invention comprises first and second operating means, preferably including pneumatic motors; first and second feeler means; first and second resilient means for mounting the feeler means on the operating means, respectively, for movement by the same between retracted positions and sensing positions resiliently abutting the workpiece; and first and second control means respectively connected with the first and second feeler means for movement with the same relative to each other, and preferably including an electric gauge secured to the first feeler means and being presettable to measurements selected for different portions of the workpiece, and a control part secured to the second feeler means and cooperating with the electric gauge.

The control means comprise actuating means, preferably including limit switches actuated by the operating means, and the valve means for controlling the flow of air to the pneumatic motors of the operating means.

In the preferred embodiment of the invention, the first operating means include carrier means for the first feeler means and for the second operating means with the second feeler means, and support means are provided which support the carrier means for movement between an inoperative position in which the feeler means are spaced from the workpiece, and an operative position in which the feeler means are located on opposite sides of the workpiece, first in retracted positions and then in sensing positions resiliently engaging the respective portion of the workpiece.

The feeler means abut the workpiece with a predetermined pressure, and it is not necessary that the pressures of the first and second feeler means are equal. However, the feelers are movable independently of each other in a plane passing through the axis of the workpiece and perpendicularly to the same for movement between the inoperative position and the operative position. By resiliently mounting the feelers on the operating means, the desired pressure during the measuring operation is obtained, and it is advantageous that the operating means of one of the feelers is mounted on, and guided in a carrier on which the other feeler is mounted. The first operating means preferably includes a supporting part guided on the machine frame and pivotally supporting the carrier of the first and second feeler means so that the same can be angularly displaced between the inoperative and operative positions.

The first and second operating means respectively move the feelers between the retracted and sensing positions, and each operating means operates independently of the other, but in a predetermined sequence of operations.

When a new portion of the workpiece is placed in the measuring zone in which the measuring apparatus is provided, the pneumatic motor of the first operating means is started by a switch controlled valve, and moves the first feeler to a position resiliently engaging the workpiece. While the first feeler is moved further toward the workpiece by the first operating means, a greater amount of energy is required since the resilient means are stressed, and when the pressure in the pneumatic system reaches a certain value, a pressure controlled electric valve is actuated which stops further flow of air into the pneumatic motor so that the first feeler means abuts the workpiece at a predetermined pressure. At the same time the operating means is blocked in this position, preferably by a mechanical blocking means.

When the first feeler is in the sensing position, the second operating means is actuated by supplying air to its pneumatic motor so that the second feeler is also moved to the sensing position resiliently engaging the workpiece. The first feeler moves further which is possible due to the resilient connection with the first operating means, whereupon a limit switch causes stopping of the operation of the pneumatic motor of the first operating means. Movement of the pneumatic motor of the first operating means is automatically blocked so that both feelers engage the respective portion of the workpiece at predetermined pressures which are not necessarily equal.

While the machine tool reduces the diameter of the respective portion of the workpiece, the feelers remain in engagement with the workpiece portion due to the resilient connection between the blocked operating means and the feelers. Since the diameter is reduced within a very small range, the resilient means supporting the feelers can be designed and constructed so that the changes of the pressures at which the feelers engage the workpiece are negligible and do not influence the results of the measurements.

The desired measurements of the workpiece, for example after rough and fine grinding, are manually or automatically preset on an electric gauge before grinding of each portion of the workpiece is started. As mentioned above, the electric gauge is secured to one of the feelers, while a corresponding control part cooperating with the gauge is mounted on the other feeler.

The movement of the feelers to and from the operative position can be effected manually or automatically upon a change of the workpiece, as well as upon a change of the portion of the workpiece on which the machine tool acts, depending on the type of workpiece.

A measuring apparatus for the control of machine tools in accordance with preset measurements is described in the Siemens Zeitschrift of September 1964, issue 9, pages 669 to 672.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary schematic vertical sectional view illustrating an embodiment of the invention in a first position; and FIG. 2 is a view corresponding to FIG. 1 and illustrating a second position in which the feelers are pressed against the workpiece.

Referring now to the drawings, the machine bed 1 of the machine tool supports a post 2 carrying two control switches 3 and 4, and a support 5 including a guide rod 6 and support plates 18 and 19. A sleeve 7 with a projecting bracket 8 is mounted on guide rod 6 for movement along the same, and carries a support 9 on which a bracket 10 of a pneumatic cylinder 11 is mounted. A piston 12 is located in cylinder 11, and has a piston rod 13a with an end portion 14 cooperating with the switch arm 15 of a limit switch 3. The other end 13b of the piston rod is pivotally connected with a hollow carrier 16 which is connected by pivot means 17 to the bracket 8. A first feeler 49 is secured to carrier 16 and is raised and lowered when sleeve 7 moves up or down on guide rod 6. Carrier 16 with feeler 49 can be turned from the operative position shown in FIGS. 1 and 2 to an angularly displaced inoperative position by means of the pneumatic motor 11, 12.

A piston rod 21 is carried by support plate 19, and can be adjusted in axial direction by suitable adjusting means, not shown. Piston rod 21 carries a piston 22 which divides the pneumatic cylinder 23 into two chambers. The upper chamber communicates with a duct in piston rod 21 connected with an air line 57, and the lower cylinder chamber communicates with an air line 56. A pressure responsive electrically controlled valve 60 is provided in air line 57. Since piston 22 is fixedly mounted on support plate 19, cylinder 23 is moved up or down when air is supplied to, and exhausted from, the cylinder chambers.

Pneumatic cylinder 23 is surrounded by a frusto-conical surface 25 of support plate 18 and in the gas between cylinder 23 and surface 25, a cage 28 with steel balls 27 is located. Due to the conical shape of surface 25 movement of cylinder 23 in one direction is blocked. Cage 28 can be operated by an angular lever 29 which is mounted in a bearing bracket 30 on support plate 18. A pull rod 31 is connected to one arm of angular lever 29 and is operated by an electromagnet 32 to move cage 28 with balls 27 out of the blocking position, permitting movement of cylinder 23 in both directions.

The lower end of cylinder 23 carries a rod 33 ending in a flange 34 on which one end of a coil spring 35 abuts. The other end of spring 35 abuts a portion of bracket 8 and urges the same with sleeve 7 upwards and towards the bottom of cylinder 23.

When pneumatic cylinder 23 is raised, sleeve 7 moves upward on guide rod 6, together with bracket 8, pivot 17, carrier 16, and a first feeler 49.

Carrier 16 is of tubular shape and carries at the top end thereof, a hydraulic cylinder 36 in which a piston 37 is movable. A piston rod 38 is secured to piston 37 and has a flange 39 on which one end of a coil spring 40 abuts. A slide 41 rests on the upper end of spring 40, and is thus resiliently suspended on piston rod 38. A second feeler 42 is secured to the bottom plate of slide 41, and is located opposite the end portion of the first feeler 49.

When pressure air is supplied into pneumatic cylinder 36 through line 58, piston 37 moves upward and raises feeler 42 to a higher position retracted from feeler 49 so that a large portion of the workpiece can be placed between the feelers.

The lower end portion 43 of piston rod 38 cooperates with the actuating arm 44 of a limit switch 45 mounted on slide 41.

An actuating portion 46 projects transversely from slide 41, and cooperates with the actuating arm 47 of a limit switch 48 which is mounted at the upper end of carrier 16.

An electric gauge 50 is secured to the inner surface of carrier 16 and cooperates with a control part 51 mounted on slide 41. The electric gauge 50 can be set to different selected measurements desired for different portions of the workpiece. Control part 51 moves with feeler 42, and gauge 50 moves with feeler 49.

Sleeve 7 carries an actuating portion 52 cooperating with the actuating arm 53 of a limit switch 4. Switch 4 controls an electrically operated valve in air line 55 and also the pressure responsive switch 60. Switch 3 controls valves in air lines 57 and 58. Pressure responsive switch 60 controls electrically operated valves in lines 57 and 59. Switch 48 controls electromagnetic means 32 by which blocking means 27, 28 are released. Switch 45 controls an electrically operated valve in fluid line 59. The electrically operated valves are not illustrated in FIGS. 1 and 2 for the sake of simplicity.

Hydraulic cylinder 11 is connected by lines 54 and 55, pneumatic cylinder 36 is connected by lines 58 and 59, and pneumatic cylinder 23 is connected by lines 56 and 57 to a source of air pressure, such as a pump, and as explained above, preferably electromagnetically operated valves, and also throttles, are provided in the air lines.

*Operation*

In the initial position of the rest of the apparatus no workpiece 26 is located between the feelers 49 and 42, and no pressure air is supplied to the pneumatic cylinders 23 and 36.

In this initial position, feelers 42 and 49 are in the lowest positions, and end portion 14 of piston rod 13a of piston 12 is located opposite actuating arm 15 of switch 3. Actuating portion 52 of sleeve 7 engages actuating arm 53 of switch 4, so that the respective electrically operated valve opens, and pressure air is supplied to pneumatic cylinder 11 through line 55 so that piston 12 moves to the right as viewed in the drawing and angularly displaces carrier 16 together with feelers 49 and 42 out of the position illustrated in FIGS. 1 and 2 of the drawing so that the feelers assume an inoperative position angularly spaced from the region of the workpiece.

The movement of piston 12 to the right causes engagement of actuating arm 15 of switch 3 by end portion 14 so that the respective electrically operated valve permits the flow of the pressure air through line 58 into the lower chamber in cylinder 36, while air is discharged from the upper chamber of cylinder 36 through line 59. Piston 37, together with piston rod 38 and slide 41 suspended thereon move upward together with feeler 42 so that feeler 42 is retracted from the region of the workpiece and from feeler 49. Piston 37 is held by the air pressure in the uppermost position in cylinder 36, while actuating portion 46 engages actuating arm 47 of switch 48 which causes movement of the workpiece supporting table to a position in which a portion of the workpiece is located in the region between the feelers 42 and 49, which are widely spaced apart. Switch 48 also causes actuation of an electrically operated valve in air line 54 so that carrier 16 with feelers 49 and 42 is turned from the angularly displaced inoperative position to an operative position in which the feelers are located on opposite sides of the workpiece portion whose diameter is to be reduced.

When carrier 16 is moved to its operative position, actuating end portion 14 is retracted from actuating arm 15 of switch 3, so that pressure air moves through line 57 into the upper chamber in the pneumatic cylinder 23. Since piston 22 is fixed in an adjusted position, cylinder 23 moves upward, raising bracket 8, carrier 16 and feeler 49 while sleeve 7 moves along guide rod 6. This upward movement is continued until the end portion of feeler 49 abuts the workpiece 26.

When sleeve 7 moves out of its lower position shown in FIG. 1, actuating portion 52 releases actuating arm 53 of switch 4 which places pressure switch 60 in line 57 in a condition of readiness. During further movement of cylinder 23, spring 33 is tensioned since feeler 49 abuts workpiece 26 so that the pressure of the fluid in line 57 rises, and pressure responsive switch 60 is operated and produces a switching impulse operating a valve in line 57 to close so that no pressure air is further supplied to pneumatic cylinder 23. Consequently, feeler 49 abuts workpiece 26 at a predetermined pressure suitable for the measuring operation.

At the same time, the blocking balls 27 are clamped between the conical surface 25 and the outer surface of cylinder 23, and prevent movement of cylinder 23 in downward direction. However, as the diameter of the respective portion of workpiece 26 is reduced, the resilient means 33 will rise members 7, 8, 16, and 49 so that feeler 49 remains in engagement with the workpiece. During the tensioning of spring 35, bracket 8 has moved away from the bottom of pneumatic cylinder 23 such a distance that such movement of the feeler during the reduction of the diameter of the workpiece is possible.

When pressure responsive switch 60 responds to the increased pressure, as explained above, it causes operation of an electrically controlled valve in line 59 so that pressure air is supplied into the upper chamber of hydraulic cylinder 36, while pressure air is discharged from the lower cylinder chamber.

Piston 37 moves downward together with piston rod 38, and since slide 41 and feeler 42 are resiliently suspended on the flange 39 of piston rod 28, feeler 42 moves downward toward the workpiece.

When feeler 42 abuts workpiece 26, piston 37 and piston rod 38 can move a small distance farther in downward direction while spring 40 is partly relieved. During such movement of piston rod 38, actuating end portion 43 engages actuating arm 44 of switch 45 which controls an electrically operated valve in line 59 so that the same closes and no further pressure air is supplied into cylinder 36 through line 59, while the pressure in the upper cylinder chamber is maintained. At the same time, the respective valve controls line 58 so that pressure air is supplied to the lower cylinder chamber of cylinder 36 causing blocking of piston 37 and of piston rod 38. Nevertheless, feeler 42 follows the surface of the workpiece portion which is being reduced due to the action of the resilient means 40. During the downward movement of slide 41 with feeler 42, control part 51 moves along the electric gauge 50, on which the desired measurements were previously preset in accordance with the dimensions desired for the respective workpiece portion. A limit switch permits the supply of a measuring current to the measuring apparatus only 0.5 mm. before the desired final measure of the workpiece is obtained. When the measurements preset on the electric gauge 50 are reached, the machine is switched from rough grinding to fine grinding, or the machine tool may be controlled in this manner to carry out corresponding successive operations of the workpiece.

When the desired final measurement is obtained by the operation of the machine tool, air line 59 is relieved, so that piston 37 is moved by the pressure in the lower cylinder chamber in upward direction and moves feeler 42 from the lower sensing position abutting the workpiece to a higher retracted position.

When members 37, 38 and 41 arrive in the upper position, actuating portion 46 of slide 41 engages actuating arm 47 of switch 48 which energizes electromagnetic means 32 so that angular lever 29 is turned to raise cage 28 with balls 27 whereby the blocking means 27, 25 are released, and cylinder 23 moves downward due to the pressure of the pressure air supplied through line 56 into the lower chamber of cylinder 23. Sleeve 7 and actuating portion 52 move downward until actuating portion 52 again engages actuating arm 53 of switch 4 so that pressure air is supplied to pneumatic cylinder 11 through line 55 whereby carrier 16, together with feelers 42 and 49 is angularly displaced to an inoperative position in a plane perpendicular to the axis of the workpiece 26.

From the above description it will become apparent that the first feeler means 49, 16, 8, 7 are connected by resilient means 33 to first operating means including pneumatic motor 22, 23 and fluid lines 56, 57, and that the second feeler means 42, 41 are connected by resilient means 40 with second operating means including piston rod 38, pneumatic motor 36, 37, and air lines 58, 59. First and second control means 50 and 51 are respectively connected with the first and second feelers 49, 42, and the first control means 50 includes an electric gauge presettable to different desired measurements and cooperating with the control part 51 for producing an impulse by which the feeler means are moved by the respective operating means to retracted positions.

It will be understood that each of the elements described above, or two or more together, may also find a useful application in other types of measuring apparatus controlling machine tools differing from the types described above.

While the invention has been illustrated and described as embodied in a measuring apparatus for measuring different portions of a workpiece which are being reduced by a machine tool controlled by the measuring apparatus, it is not intended to be limited to the details shown, since various modifications and structural changes may be made without departing in any way from the sprit of the present invention.

Without further analysis, the foregoing will so fully reveal the gist of the present invention that others can by applying current knowledge readily adapt it for various applications without omitting features that, from the standpoint or prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Measuring apparatus for successively measuring different portions of a workpiece, comprising, in combination, first and second operating means movable between two end positions; first and second feeler means; first and second resilient means for mounting said first and second feeler means on said first and second operating means, respectively, for movement by said first and second operating means moving between said end positions, respectively, between retracted positions, and sensing positions resiliently abutting a portion of the workpiece while the same is being reduced by a machine tool; and first and second control means respectively connected with said first and second feeler means for movement with the same relative to each other, and being presettable to measurements selected for different portions of the workpiece, and including means for actuating said first and second operating means to return said first and second feeler means to said retracted positions when the respective portion of the workpiece has been reduced to the respective selected masurement.

2. An apparatus according to claim 1 wherein said first feeler means include carrier means and a first feeler mounted on said carrier means, and a movable support pivotally supporting said carrier means, said carrier means supporting said second operating means and said second feeler means, said second feeler means including a second feeler located opposite said first feeler; and comprising a motor connected with said carrier for moving said first and second feelers between an operative position located on opposite sides of the workpiece, and an inoperative position angularly spaced from the same.

3. An apparatus according to claim 1 and including guide means for guiding said first feeler means in one direction for movement between said retracted and sensing positions.

4. An apparatus according to claim 3 wherein said second operating means include guide means for guiding said second feeler means in said direction.

5. An apparatus according to claim 4 wherein said second operating means include a pneumatic cylinder, a piston in said pneumatic cylinder, a piston rod secured to said piston, and an abutment on said piston rod for said second resilient means, said pneumatic cylinder guiding said piston and said first feeler means in said direction.

6. An apparatus according to claim 5 wherein said first operating means include a pneumatic cylinder, and a piston in said cylinder.

7. An apparatus according to claim 6 and including switch means actuated by said first feeler means in said retracted position to cause actuation of said first feeler means by said pneumatic cylinder of said first operating means.

8. An apparatus according to claim 6 and including a switch operated by said piston rod of said second operating means for causing the supply of pressure air into said pneumatic cylinder of said second operating means for blocking said piston of said second operating means.

9. An apparatus according to claim 8 and including blocking means for blocking said cylinder of said first operating means when said first feeler means abuts a workpiece in said sensing position.

10. An apparatus according to claim 9 wherein said blocking means include a support having a frusto-conical surface surrounding said cylinder of said first operating means, a cage, and blocking balls in said cage between said cylinder and said frusto-conical surface for blocking movement of said cylinder in one direction.

11. An apparatus according to claim 10 and including a switch operated by said second feeler means in said retracted position, and electromagnetic means operatively connected with said cage for moving the same with said blocking balls to a position releasing said cylinder of said first operating means in said retracted position of said second feeler means.

12. An apparatus according to claim 1 including supporting means having a guide means extending in one direction; wherein said first feeler means include a member mounted on said guide means for movement in said direction, a carrier pivotally mounted on said member, and a first feeler secured to said carrier and movable with the same in said direction.

13. An apparatus according to claim 12 wherein said second feeler means is mounted on said carrier and guided for movement in said direction between said retracted and sensing positions.

14. An apparatus according to claim 13 wherein said carrier is mounted for pivotal movement on said member for moving at least said first feeler between an operative position for sensing the workpiece and an angularly displaced inoperative position spaced from the same.

15. An apparatus according to claim 1 wherein said first and second operating means respectively include first and second pneumatic motors having reciprocable members, and wherein said first and second resilient means respectively include first and second springs abutting said reciprocable members, and said first and second feeler means, respectively.

16. An apparatus according to claim 1 and including first and second blocking means for respectively blocking said first and second operating means and being actuated when said first and second feeler means abut a workpiece so that said feeler means remain in positions abutting said workpiece while the same is being reduced due to the action of said first and second resilient means.

17. An apparatus according to claim 16 and including means for releasing said first and second blocking means in a predetermined relative position of said first and second control means corresponding to the desired measurement of the workpiece.

No references cited.

HARRY N. HAROIAN, *Primary Examiner.*